Nov. 26, 1957 C. E. MANHART ET AL 2,814,336
SEAT-BELTS
Filed July 28, 1955
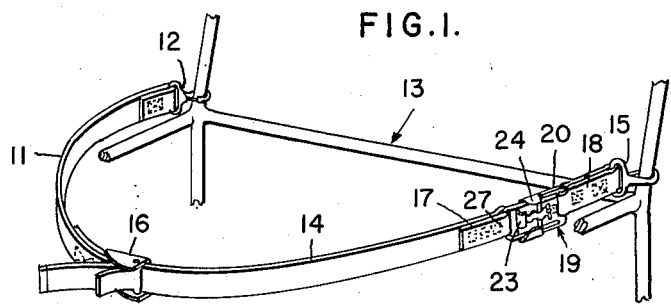
FIG.1.
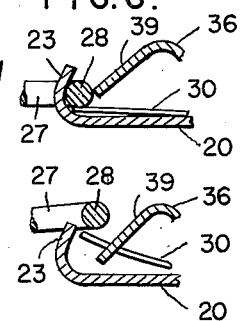
FIG.6.
FIG.7.
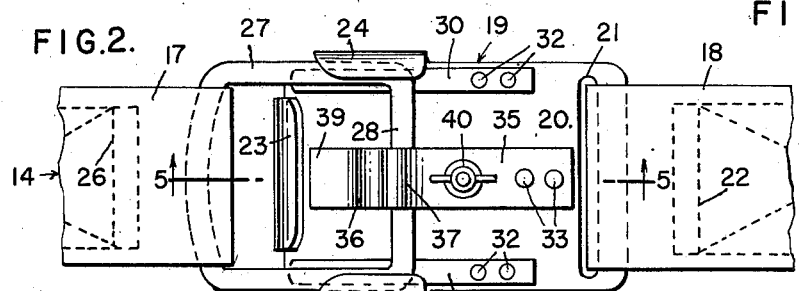
FIG.2.
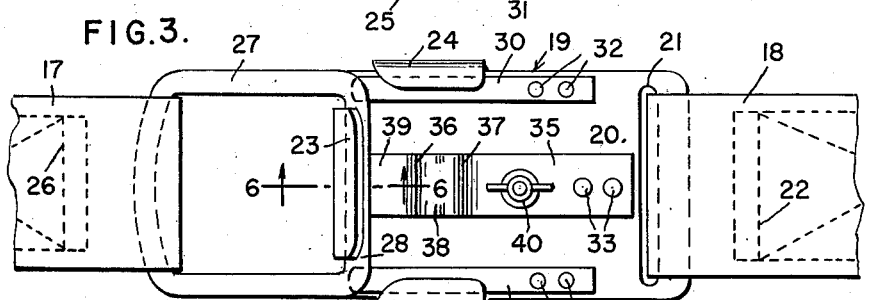
FIG.3.
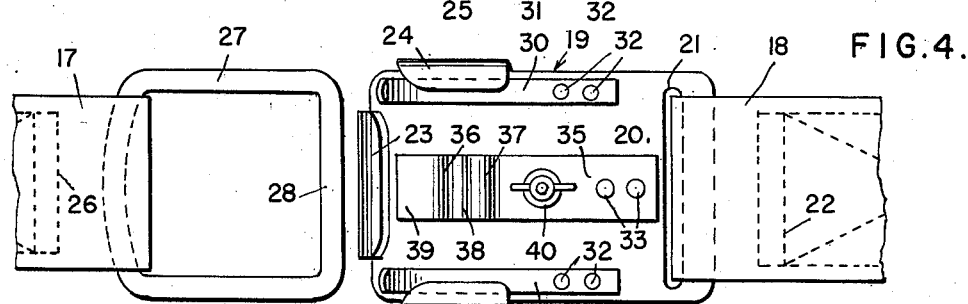
FIG.4.
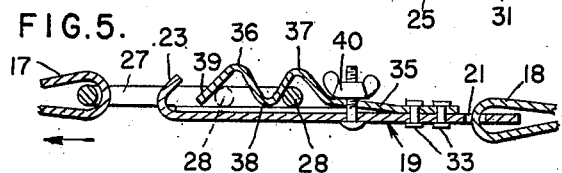
FIG.5.
INVENTORS
Louis E. Castell
BY Charles E. Manhart
Arthur Middleton
ATTY.

United States Patent Office 2,814,336
Patented Nov. 26, 1957

2,814,336

SEAT-BELTS

Charles E. Manhart and Louis E. Castell, Miami, Fla.

Application July 28, 1955, Serial No. 524,880

6 Claims. (Cl. 155—189)

This invention relates to seat-belts for mobile vehicles such as airplanes and automobiles. These belts are usually made in two sections with the rear end of each section secured to the frame of the seat so that the sections may be passed around the passenger's body. The other ends of the belt sections are provided with buckle or other fastening means. Such means usually includes a frictional grip-exerting fastener comprising a lever that rocks a corrugated or serrated cylinder that is eccentrically journalled. When there is a collision or crash, the passenger's body is thrown against the seat-belt with such force that often the belt fastener becomes deformed or jammed so that it is not readily unfastened. So it is an object of this invention to provide a passenger release mechanism in at least one of the belt sections, leaving the belt fastener unchanged in its construction. Another object is to devise such a mechanism linking parts of a belt section that while it loosens the belt it continues to hold the belt in latched condition around the passenger so long as a pull above a predetermined amount is exerted on the mechanism by the passenger through the belt. And it is a still further object of this invention to devise such a mechanism that thereafter upon cessation of substantially all pull on the belt causes the mechanism to become unlatched, whereupon the linkable belt parts fall into unlinked and disconnected condition.

These objects, and others that may appear as this description proceeds, can be realized by a construction comprising a passenger release mechanism interposed between linkable parts of one of the belt sections, which mechanism has a plate secured at one end to one of the linkable parts, a loop element secured at one end to the other linkable part of the belt and having a cross-bar at its free end, and automatic release means on the plate for holding the cross-bar secured to the plate so long as a pull above a predetermined amount is exerted on said release means by the passenger's body through the belt. A further feature is embodied in latch means on the plate for retaining the released cross-bar of the loop in contact with the plate until the pull thereon is reduced below the predetermined amount but continues to be above a reduced minimum amount. And a still further feature is embodied in spring means for unlatching the cross-bar out of contact with the plate when pull on the loop substantially ceases. Other details of construction hereinafter described offer still further features of advantage.

The invention is illustrated in the accompanying drawings, in which Figure 1 is a perspective view of the improved seat-belt secured in place to parts of the seat framework. Fig. 2 shows a plan view of the seat-belt release mechanism in belt-securing position. Fig. 3 shows a similar view but with the seat-belt partially released. Fig. 4 is also a similar view but with the seat-belt entirely released. Fig. 5 shows a vertical sectional view through the releasable fastener taken along the line 5—5 in Fig. 2. Fig. 6 is a partial vertical sectional view through a detail taken along the line 6—6 in Fig. 3, while Fig. 7 is a partial vertical sectional view through a detail showing the next step in release of the parts as shown in Fig. 6.

In the drawings, 11 indicates one end section of the seat-belt secured by fastener 12 to the framework 13 of the seat. 14 indicates the other end section of the seat-belt, secured by fastener 15 to the framework 13 of the seat. The free ends of the sections 11 and 14 are fastened by the usual passenger-operated releasable belt-closing fastener 16. The seat-belt section 14 is divided into two linkable parts 17 and 18, holding between the adjacent ends thereof automatic belt-release means indicated generally at 19, but made up of a plate 20 having an end slot 21, through which the part 18 of the linkable parts of the seat-belt is looped and stitched at 22. The plate 20 of the automatic release fastener 19, has at its free end an upwardly curved lip or flange that in effect forms a hook 23, and on this plate there are also provided two laterally extending upwardly curved wing-like lugs 24 and 25, forming a runway between their upper parts and plate 20. The free end of the belt section 17 is looped around and stitched as at 26 to a buckle-like element 27 having at its front end a cross-bar 28 for attachment in a releasable manner to the plate 20 by sliding longitudinally thereof in the runway provided by the bent-over lugs 24 and 25.

The plate 20 is also provided with a flat spring 30 and 31 near each lateral margin thereof, riveted to the plate 20, as at 32. Plate 20 also has secured to its top face, as by riveting as at 33, a latching tongue or strip or bar 35 of springy metal having toward its free end serration-like bends 36 and 37 with a reverse bend or valley 38 therebetween, and a free downwardly bent tongue 39. The tensioning of the latching strips 35 can be adjusted by turning the butterfly nut 40.

Under normal conditions when a passenger occupies the seat and the seat-belt is fastened around the passenger, the parts are as shown in Figs. 1 and 2, wherein the free ends of the linkable parts 17 and 18 of the belt hold between them the passenger release link mechanism indicated generally at 19. In this position, the cross-bar 28 of the loop element 27 carried by the end of the linkable part 17 of the belt, is securely held locked to the plate 20 carried by the end of the other linkable part 18 of the belt, by being held against the plate 20 by the runways provided by the bent-over lugs 24 and 25 on the marginal lateral edges of the plate 20. The cross-bar is also held against normal release as a result of its engagement, as shown in Figure 5, with the spring-biased valley-like bend 38 on the latching strip 35. In other words, the cross-bar 28 will not normally move toward the hooked lip 23 at the end of the plate 20 unless and until so much pulling force is applied through the linkage part 17 of the seat-belt and the loop element 27 that it carries, that that force is greater than the power exertable by the spring 35, through its serrations 36 and 37, to continue to hold the cross-bar 28 in place.

If and when such force above a predetermined amount and relatively greater than the force of the springy latching bar 35, is applied to the cross-bar, it slips under the valley 38 because that valley and its springy strip is raised to permit such slipping. It is to be noticed that the cross-bar then moves toward the left against the inclined plane of the bar 35 that ends in the valley 38 thereof. As soon as the cross-bar slides under the valley 38, it encounters and engages the downwardly extending end tongue 39 on bar 35, as shown in dotted lines in Fig. 5. If the force pulling against the cross-bar lessens, then the cross-bar remains locked in this position, but if the force continues great enough, the cross-bar lifts the tongue 39 and slides under it until the cross-bar finds itself free from the runway formed by the bent-over lateral lugs 24 and 25, whereupon continued pull on the cross-bar engages it with the hook 23 at the end of the plate 20, as shown in Figs. 3 and 6.

But as soon as the position shown in Fig. 6 is reached and if pull thereon has substantially ceased, the flat springs 30 and 31 take over and spring the cross-bar from the position engaging the hook 23, as shown in Fig. 6, to be free completely from the release link mechanism 19, as shown in Fig. 7, whereupon the seat-belt falls open and the passenger can leave the seat without having to unfasten anything.

In assembling the parts of the release link mechanism, these motions and positions are reversed. That is, the cross-bar is first put into the position shown in Fig. 7, then it is depressed into the position shown in Fig. 6, whereupon it is then slid against the tongue 39 to pass under it, then threaded into the runway formed by the bent-over lateral lugs 30 and 31. And finally, pushed to the right to slide under the valley 38 until it reaches locked position as shown in Fig. 5. It is to be noticed though that in this sliding of the cross-bar both in and out under the valley 38 and the tongue 39, it encounters inclined planes in both directions of travel, which significantly facilitates the lifting of the bent sections of the latching bar or strip 35 to let the cross-bar pass thereunder.

As this invention may be embodied in several forms without departing from the spirit or essential characteristics thereof, the present embodiment is therefore illustrative and not restrictive, since the scope of the invention is defined by the appended claims rather than by the description preceding them, and all changes that fall within the metes and bounds of the claims or that form their functional as well as conjointly co-operative equivalents, are therefore intended to be embraced by those claims.

We claim:

1. In a seat-belt for motor vehicles such as airplanes and automobiles having a seat frame, a buckle-carrying belt section securable at its free end to one side of the frame, and another belt section securable at its free end to the other side of the frame; a passenger release link mechanism interposed between linkable parts of one of the belt sections comprising a plate secured at one end to one of the linkable parts, a loop element secured at one end to the other linkable part having a cross-bar at its free end, latch means on the plate for retaining the released cross-bar of the loop in contact with the plate until the pull thereon is reduced below the predetermined amount but continues to be above the reduced minimum amount, spring means for unlatching the cross-bar out of contact with the plate when the pull on the loop substantially ceases, and automatic release means on the plate for holding the cross-bar secured to the plate so long as a pull above a predetermined amount is exerted on said means by the passenger's body through the belt.

2. In a seat-belt for motor vehicles such as airplanes and automobiles having a seat frame, a fastener-carrying belt section securable at its free end to one side of the frame, and another belt section carrying at one end a fastener co-actable with the fastener on the other belt section and at its other end is securable to the other side of the frame; a passenger release link mechanism interposed between linkable parts of one of the belt sections comprising a plate secured at one end to one of the linkable parts, a loop element secured at one end to the other linkable part provided with a cross-bar at its free end, means on the plate in which the loop is slidable along the plate, a first spring means for holding the loop against such sliding action until a pull above a predetermined amount is exerted thereon by the passenger's body through the belt, latch means for catching and holding the cross-bar of the loop on the plate when such pull above the predetermined amount causes release of the loop from the spring means, and further spring means for unlatching the loop from the plate when pull on the loop substantially ceases.

3. Apparatus according to claim 2, wherein the means on the plate in which the loop is slidable comprises a runway therefor established by bent-over lateral edges of the plate.

4. Apparatus according to claim 2, wherein the first spring means comprises a spring bar secured to the plate at one end and terminating at its free end in serrations presenting inclined planes for holding the cross-bar.

5. Apparatus according to claim 2, wherein the means on the plate for holding the plate against sliding action is a bent-over edge portion on each lateral side of the plate, and wherein the further spring means comprise longitudinally extending leaf springs adjacent the lateral edges of the plate having free ends terminating just short of the bent-over end edge of the plate whereby when pull on the cross-bar substantially ceases the cross-bar is sprung away and thus unlatched from contact with its latching bent-over end edge of the plate.

6. Apparatus according to claim 5, wherein the latch means comprises a bent-over end edge of the plate adapted to catch and to hold the cross-bar when the bar moves into contact therewith.

References Cited in the file of this patent

UNITED STATES PATENTS

| | | |
|---|---|---|
| 1,158,827 | Maricet | Nov. 2, 1915 |
| 1,696,118 | Heintz | Dec. 18, 1928 |
| 2,280,694 | Embree et al. | Apr. 21, 1942 |
| 2,372,558 | Dowd | Mar. 27, 1945 |
| 2,648,884 | Loofboro | Aug. 18, 1953 |
| 2,754,073 | Holm et al. | July 10, 1956 |